United States Patent
Martin et al.

[11] 3,922,158
[45] Nov. 25, 1975

[54] METHOD FOR INHIBITING THE GROWTH OF DICOTYLEDONOUS PLANTS

[75] Inventors: Henry Martin, Basel; Jacques Rufener, Rheinfelden, both of Switzerland; Georg Pissiotas, Lorrach, Germany

[73] Assignee: Ciba-Geigy AG, Basel, Switzerland

[22] Filed: Feb. 14, 1974

[21] Appl. No.: 442,553

Related U.S. Application Data

[60] Continuation-in-part of Ser. No. 223,041, Feb. 2, 1972, abandoned, which is a division of Ser. No. 783,133, Dec. 11, 1968, Pat. No. 3,658,892.

[52] U.S. Cl. .................................. 71/76; 71/115
[51] Int. Cl.² ................................. A01N 5/00
[58] Field of Search ............................ 71/115, 76

[56] References Cited
UNITED STATES PATENTS

| | | | |
|---|---|---|---|
| 2,556,665 | 6/1951 | Smith et al. | 71/115 |
| 3,403,994 | 10/1968 | Olin | 71/118 |
| 3,407,056 | 10/1968 | Schwartz | 71/118 |
| 3,475,155 | 10/1969 | Ishida et al. | 71/118 |
| 3,485,872 | 12/1969 | Kageyama et al. | 71/118 |

FOREIGN PATENTS OR APPLICATIONS

| | | | |
|---|---|---|---|
| 42-25191 | 1/1967 | Japan | 71/115 |

OTHER PUBLICATIONS

Barruffini et al., "Selective phytotoxic anilides, etc.," (1967), CA 68, No. 77872x. (1968).

*Primary Examiner*—Glennon H. Hollrah
*Attorney, Agent, or Firm*—Harry Falber; Frederick H. Rabin; Karl F. Jorda

[57] ABSTRACT

This invention relates to a method for inhibiting the growth of dicotyledonous plants by means of N-arylphthalamide-acids corresponding to the formula

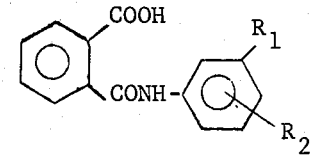

wherein
$R_1$ is trifluoromethyl, halogen or methoxy
$R_2$ is hydrogen, halogen, trifluoromethyl,
and salts thereof with inorganic and organic bases.

3 Claims, No Drawings

METHOD FOR INHIBITING THE GROWTH OF DICOTYLEDONOUS PLANTS

CROSS REFERENCE

This application is a continuation-in-part of our application No. 223,041 filed Feb. 2, 1972 now abandoned....., which is a divisional of our application No. 783,133 filed Dec. 11, 1968, now U.S. Pat. No. 3,658,892.

DETAILED DISCLOSURE

This invention relates to a method for inhibiting or retarding the growth of dicotyledonous plants by means of N-arylphthalamide-acids of formula

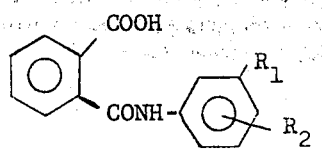

wherein
$R_1$ is trifluoromethyl, methoxy or halogen
$R_2$ is hydrogen, halogen or trifluoromethyl
and salts thereof with inorganic and organic bases.

The substituent $R_1$ is in the meta-(3') position of the aniline ring, the preferred halogen atoms are chlorine, bromine or iodine. The substituent $R_2$ is in any other position 4', 5' or 6' and the preferred halogen atoms are fluorine and chlorine.

As inorganic bases there are suitable, for example, alkali hydroxides such as NaOH, LiOH, $NH_4OH$, $Ca(OH)_2$.

As organic bases there are suitable, for example, simple aliphatic amines, such as methylamine, dimethylamine, diethylamine, piperidine, morpholine, ethanolamine, diethanolamine or triethanolamine.

For special purpose — particularly in order to make the active substances of formula (I) more lipophilic — there are used for salt formation fatty amines, such as oleylamine, stearylamine and the like.

N-arylphthalamide acids have been proposed for regulating plant growth and their phytocidal activity. In the U.S. Pat. No. 2,556,665 such acids are described as agents for improving the rooting of cuttings, prevention of fruit drop, and provocation of forming parthenocarpic (seedless) fruit and altering the leaf shape in tomato plants. Baruffini et al. in Farmaco 22 p. 895–916 (1967) discloses the herbicidal activity of the N-arylphthalamide-acids o-phthalicacid-3'-trifluoromethylanilide, o-phthalicacid-4'-ethoxyanilide and o-phthalicacid-(4'-chloro-3'-trifluoromethylanilide). Preparations for regulating plant growth usually prevent unequal and premature ripening of the fruit, the putting forth of root-shoots or rice, the formation of parthenogenetic (seedless) fruit and change in the shape of the leaf.

Known regulating substances for plant growth that are used in order to initiate the setting of fruit, for example o-chlorophenoxy-propionic acid and p-chlorophenoxyacetic acids, must only be applied to the blossom in order to avoid injuring the plant.

The compounds of formula I however are useful for inhibiting or retarding the growth of dicotyledonous plants, among them especially soya and wood plants like trees and bushes.

The retardation of the vegetative growth of soybeans is of great practical importance.

The soybean is well known for its inefficiency from at least two aspects: Only about 50% of its leaves intercept light for photosynthesis with the others becoming parasites. And, only about 20% of the total sugar photosynthesized is converted into beans. The remaining 80% of photosynthate is used for the production of vegetative tissue, nutrition of the nitrogenfixing bacteria in root nodules, and for respiratory energy needed to maintain vital processes. All of these may be considered useful expenditures of photosynthate, but in a fully developed canopy there are many shaded, non productive leaves. If this excessive production of vegetation could be prevented, then higher yields of beans can be expected.

Yield increase will also result from two other aspects of growth retardation:

Lower and compacter plants are better protected against lodging caused by rain and wind. (see Lit.: "Early lodging—a mayor barrier to higher yields" by R. L. Cooper, in: 1970 Soybean Digest, Hudson, Iowa 50643).

A reduction of the size of plants by chemicals allows a narrower planting in the field. The increased plant population will also give increased yields. The reduction of the growth of trees and bushes saves labor in cutting hedges and trees for instance under aereal telephone or electrical lines. (In USA about 125 million dollars spent yearly for such line clarance work).

The inhibiting of the growth of soya beans and in hedges was especially observed with the following compounds:

o-phthalic-acid-3'-trifluoromethylanilide and its sodium salt
o-phthalic-acid-(3',5'-di-trifluoromethylanilide)
o-phthalic-acid-3'-methoxyanilide
o-phthalic-acid-(4'-chloro-3'-trifluoromethylanilide)
o-phthalic-acid-(6'-chloro-3'-trifluoromethylanilide) and its sodium salt The compounds of the invention may be sprayed on to the plant in a concentration which inhibits the growth thereof without causing any damage.

In a higher concentration the compound of the invention are phytocidal and may be used to combat undesirable plants.

The compounds of the invention may be applied in various ways. for example in the form of powders, aqueous dispersions, aqueous emulsions, granules and so on.

The N-arylphthalamide acids may be applied to the plants in an inert medium, for example as a dust with a powdery carrier from the series of the mineral silicates, for example mica, talc, pyrophyllite or clay, or they may be sprayed in aqueous solution. The effect on the plants depends, when using various concentrations, on the character of the media, on dosage, on the season and on the age, genus and type of plant, but also on the climatic conditions or the weather. The following general rule for effect and concentration of the compounds of the invention may be set up: Effects regulating development are definitely seen in concentrations of 10 to 10,000 parts per million of the compound in aqueous suspension; phytocidal and weed - combating effects are apparent when higher concentrations of the active substance are used, whilst phytocidal and weed-combating effects only become absolutely definite when 1 % of active substance is used.

The compounds of the invention are preferably used in admixture with a small quantity of a surface-active dispersant that may be an anionic surfactant, a non-ionic or a cationic surfactant. Such a surfactant helps the N-arylphthalamide acids disperse in water so that they can be sprayed. The N-arylphthalamide acids may also be admixed with powdery carriers, such as mineral silicates together with a small quantity of such a surface-active dispersant in such a way that a readily wettable powder is obtained that can be applied directly to the plants or shaken with water in order to rapidly make a suspension of the chemical compound and of the powdery carrier in water.

The anionic surfactants that can be used in the present compounds or preparations influencing plant growth and development correspond to the general formula R—COOM or R—SO$_3$M, in which M represents an alkali metal, ammonium or a substituted ammonium or amine radical and R represents an organic radical that contains at least one group having more than 8 carbon atoms.

The active substance of formula I may be prepared by reacting phthalic acid or phthalic acid anhydride with a corresponding aniline of the formula

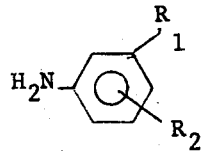

in molten form or in a solvent, and if phthalimides of the formula

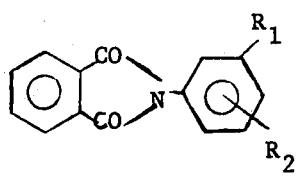

are formed as intermediate products, the latter are hydrolysed subsequently with, for example, a base such as alkali hydroxide, and the compounds of formula I precipitate by acidification. In the above formula $R_1$ and $R_2$ have the meanings given above. (cf. for example A. Burger et al.; J. Org. Chem. 18, 192–195 (1953).

The following Examples explain the features of this invention in more details, temperatures are given in degrees centigrade, the percentages are by weight.

EXAMPLE 1 (MANUFACTURE OF COMPOUNDS)

80.5 g of m-trifluoromethylaniline are dissolved in 300 cc of dioxan in a stirring flask. 74 g of phthalic acid anhydride are added in small portions with stirring. The exothermic reaction sets in immediately. The reaction mixture is stirred overnight at room temperature and the precipitate then filtered with suction and dried, to yield 121 g of o-phthalic-acid-3'-trifluoromethylanilide (compound No. 1) of formula

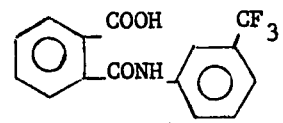

melting point 183°–185°.

In an analogous manner the following phthalamide acids are prepared:

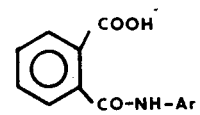

| Compound No. | Ar | m.p. | name |
|---|---|---|---|
| 2 | (phenyl with OCH$_3$) | 171° | o-phthalic-acid-3'-methoxyanilide |
| 3 | (phenyl with CF$_3$ and Cl) | 160–162° | o-phthalic-acid-(6'-chloro-3'-trifluoromethyl-anilide) |
| 4 | (phenyl with CF$_3$ and Cl) | 189–190° | o-phthalic-acid(4'-chloro-3'-trifluoromethyl-anilide) |
| 5 | (phenyl with CF$_3$ and F) | 180° | o-phthalic-acid(6'-fluoro-3'-trifluoromethyl-anilide) |

-continued

| Compound No. | Ar | m.p. | name |
|---|---|---|---|
| 6 | (phenyl with I) | 174–175° | o-phthalic-acid-3'-iodoanilide |
| 7 | (phenyl with CF$_3$, CF$_3$) | 185–186° | o-phthalic-acid-(3'5'-di-trifluoromethyl-anilide) |
| 8 | (phenyl with Cl) | dec. Na salt | o-phthalic-acid-3'-chloranilide Na salt |
| 9 | (phenyl with Cl) | 180° | o-phthalic-acid-3'-chloroanilide |
| 10 | (phenyl with CF$_3$, Cl) | 205° Na salt | o-phthalic-acid(6'-chloro-3'-trifluoromethyl-anilide) Na salt |
| 11 | (phenyl with Br) | 184 | o-phthalic-acid-3'-bromanilide. |

EXAMPLE 2 (FORMULATION)

Dusting Agents

Equal quantities of an active substance of the invention and precipitated silicic acid are finely ground. By adding kaolin or talc to the mixture a dusting agent can be prepared that contains preferably 1–6% of active ingredient.

Spraying Powder

In order to prepare a spraying powder the following components, for example, are mixed and finely ground:
50 parts of active substance
20 parts of Hisil (highly adsorbent silicic acid)
25 parts of Bolus alba (kaolin)
3.5 parts of the reaction product from p-tertiary octylphenol and ethylene oxide
1.5 parts of (1-benzyl-2-stearyl-benzimidazole-6,3'-sodium disulphonate).

Emulsion Concentrate

Readily soluble active substances may also be used as emulsion concentrate according to the following prescription:
20 parts of active substance
70 parts of xylene
10 parts of a mixture from a reaction product of an alkylphenol with ethylene oxide and calcium dodecylbenzene sulphonate are mixed. On dilution with water to the desired concentration a sprayable emulsion is formed.

Example 3 (Inhibition of Growth in Soya)

a. Aqueous solutions of the active substances prepared from emulsion concentrates were used in quantities of 5 kg/ha of active ingredient to test growth-inhibiting properties in soya fields in pre-emergence and post-emergence procedures. When the crops were harvested the following results were obtained:

| Compound No. | Pre-emergence Kg/ha | Inhibition | Remark | Kg/ha | Post-emergence Inhibition | Remark |
|---|---|---|---|---|---|---|
| 1 | 5 | 5 | Stronger green colouring of the leaves | 5 | 4 | Stronger green colouring of the leaves |
| 2 | 5 | 3 | — | 5 | 5 | Stronger green colouring of the leaves |
| Comparison *A | 5 | 1 | — | 5 | 1 | — |

A = o-phthalic-acid 3'-methylanilide, known from U.S. Pat. No. 2,556,665

Growth-inhibition:
1 = no inhibition
2 = slight inhibition
3 = moderate inhibition
4 = middling inhibition
5 = strong inhibition b. In a field test carried out in Columbia in 1969 soybeans of the variety Mandarin were planted in rows 40 cm apart. One month later, when the young plants had formed 4 trifoliated leaves, the field was divided in plots of 10 m² and the different plots were sprayed with aqueous emulsions of the test compounds No. 1, 4, 2 and A at a rate of 0,5 kg/ha. Some plots were left untreated and served as control. Two months later, shortly before harvest the plant regulating activity of the compounds was evaluated.

| Compound tested | medium heigth of plants | medium diameter of plants | observations |
|---|---|---|---|
| control (untreated) | 100% | 100% | |
| No. 1 | 71% | 72% | increased pod set |
| No. 4 | 86% | 84% | increased pod set |
| No. 2 | 88% | 76% | normal pod set |
| A | 96% | 92% | normal pod set | c. In another field test, carried out at Stein, Switzerland in 1969, soybeans of the variety "Grosskorn" were planted in rows 70 cm apart. When plants had formed 4 trifoliated leaves, plots of 8,4 m² were sprayed with aqueous emulsions of the compounds Nos. 1, 4, 2 and A at a rate of 1 kg active material per hectar. (The rate of 1 kg active material per hectar is higher than the rate which is normally used but it demonstrates more clearly the growth regulating properties of the test chemicals). Some plots were left untreated and each treatment was made with 3 replicates following a randomized plot design. Two months after application, when plants had set pods, the height of the plants was determined and following results obtained.

| Compound tested | average height of plants | Observations |
|---|---|---|
| control (untreated) | 58,7 cm | — |
| No. 1 | 29,3 cm | compact plants with dark green leaves |
| No. 4 | 44,0 cm | stronger green colouring of the leaves |
| No. 2 | 48,9 cm | stronger green colouring of the leaves |
| A | 54,8 cm | — | d. In a soybean field test in Boone Iowa, USA (1971) the positive effect of the compounds Nos. 1, 4 and 2 on the bean yield has been demonstrated. Soybeans of the Wayne variety were grown in rows 25 inches apart, which is ⅔ of the normal row spacing. When plants had developed 7 trifoliate leaves, plots of 120 square feet were sprayed with aqueous emulsions of the compounds No. 1, 4 and 2. 8 plots were left untreated and of each treatment 4 replicates were made following a randomized plot design. At harvest the bean yield of every plot was determined and the following results obtained.

| Compound | used rate in kg active material per hectar | average bean yield in bushel per acre |
|---|---|---|
| control (untreated) | — | 17,7 |
| No. 1 | 0,3 | 24,3 |
| No. 4 | 0,8 | 20,0 |
| No. 2 | 0,6 | 18,9 |

EXAMPLE 4 (GROWTH INHIBITION IN LIGUSTRUM)

A hedgerow of privet-bushes (ligustrum) was sprayed in early spring, before the growth had started with an aqueous suspension of compound No. 1. For each treatment 12 bushes were sprayed until run off while 12 other bushes were left untreated to serve as control. The concentrations of the aqueous suspensions were 5000 and 2500 ppm. The test was evaluated 1, 3 and 5 month after the treatment and the length of the newly grown shoots serve as control for the results.

| Compound | amount applied | medium length of newly grown shoots after 1 month | 3 month | 5 month |
|---|---|---|---|---|
| control | — | 100% | 100% | 100% |
| 1 | 5000 ppm | 9% | 29% | 37% |
| 1 | 2500 ppm | 26% | 41% | 46% |

We claim:
1. A method for retarding the growth of soya plants which comprises supplying to said plants an effective non-phytotoxic amount of o-phthalic-acid-3'-trifluoromethyl-anilide or the sodium salt thereof.

2. A method for retarding the growth of soya plants which comprises applying to said plants an effective non-phytotoxic amount of o-phthalic-acid-3'-methoxy-anilide or the sodium salt thereof.

3. A method for retarding the growth of soya plants which comprises applying to said plants an effective non-phytotoxic amount of o-phthalic-acid-4'-chloro-3'-trifluoromethylanilide or the sodium salt thereof.

* * * * *

UNITED STATES PATENT AND TRADEMARK OFFICE
CERTIFICATE OF CORRECTION

PATENT NO. : 3,922,158
DATED : November 25, 1975
INVENTOR(S) : Henry Martin, Jacques Rufener and Georg Pissiotas It is certified that error appears in the above—identified patent and that said Letters Patent are hereby corrected as shown below:

The following should be inserted in the heading:

Claims priority, application Switzerland

December 19, 1967, No. 17795/67

Signed and Sealed this

Twentieth Day of July 1976

[SEAL]

*Attest:*

RUTH C. MASON
*Attesting Officer*

C. MARSHALL DANN
*Commissioner of Patents and Trademarks*